Patented Sept. 9, 1941

2,255,386

UNITED STATES PATENT OFFICE 2,255,386

TREATMENT OF RUBBER

Louis H. Howland, Nutley, N. J., assignor, by mesne assignments, to United States Rubber Company, New York, N. Y., a corporation of New Jersey No Drawing. Application March 24, 1938, Serial No. 197,857

3 Claims. (Cl. 260—809)

This invention relates to the treatment of rubber and similar oxidizable materials, and more particularly to a new class of deterioration retarders.

This case is a continuation-in-part of application Serial No. 29,649, filed July 3, 1935.

An object of the invention is to provide a new class of anti-oxidants or age resistors for organic substances which tend to deteriorate by absorption of oxygen from the air, for example goods of rubber or allied gums, unsaturated fatty oils such as unsaturated vegetable oils, essential oils, petroleum oils and their derivatives such as gasolines, soaps, aldehydes, synthetic resins, turpentine, paints and varnishes containing drying oils, and the like. Further objects will be apparent from the following description.

The age resistors or anti-oxidants herein are generally described as the products formed by the reaction of a diaryl-arylene-diamine and an aliphatic alcohol, wherein the aliphatic portion contains at least two and preferably more than two, carbon atoms, particularly the branched chain aliphatic alcohols. The reaction which is believed to result in nuclear and/or N-alkylated products, is carried out at relatively high temperature in the presence of a catalyst or condensing agent, for example mineral non-oxidizing acids, halogen, or metal halides, such as hydrochloric acid, iodine, ferrous iodide, hydriodic acid, stannic chloride, aluminum chloride, zinc chloride, ammonium chloride, etc.; during the reaction water is split off.

The reaction product may be used as such or it may be freed of various components such as unreacted starting chemicals. Materials which lower the anti-oxidant value of the reaction product, such as acid or acidic substances, are preferably neutralized or removed.

While the individual chemical components may be recovered and used, the composite reaction product possesses properties which are superior to individual components from the standpoint of protective action, cost, ease of incorporation in rubber, or of handling prior to adding to the rubber.

The materials have special and outstanding properties in connection with the preservation of rubber and vulcanized rubber goods whereby to protect the same against deterioration caused by heat, light, oxygen, etc. The following example is given in illustration of the invention, using commercial rubber compounds. T represents tensile in pounds per square inch, and E is elongation at break. The parts are by weight.

EXAMPLE 1

| Rubber compound | Control | Stock containing antioxidant |
|---|---|---|
| Smoked sheet | 100 | 100 |
| Carbon black | 42 | 42 |
| Zinc oxide | 10 | 10 |
| Pine tar | 3.5 | 3.5 |
| Stearic acid | 1.25 | 1.25 |
| Sulphur | 3.25 | 3.25 |
| Hexamethylenetetramine | 1.25 | 1.25 |
| Diphenylguanidine | .35 | .35 |
| Reaction product of diphenyl p-phenylene diamine and tertiary butyl alcohol | | 1.0 |

Unaged

| Cure in min. at 45 lb. per sq. in. steam pressure | T | E | T | E |
|---|---|---|---|---|
| 60' | 4312 | 7.3 | 4428 | 7.3 |
| 75' | 4220 | 6.8 | 4223 | 7.0 |

Aged

| Cure in min. at 45 lb. per sq. in. steam pressure | T | E | T | E |
|---|---|---|---|---|
| (144 hrs. in oxygen): | | | | |
| 60' | 552 | 3.4 | 1644 | 5.1 |
| 75' | 440 | 2.7 | 1453 | 4.6 |
| (48 hrs. at 212° F.): | | | | |
| 60' | 1105 | 3.5 | 1837 | 4.1 |
| 75' | 847 | 2.9 | 1506 | 3.6 |
| (3 weeks at 158° F.): | | | | |
| 60' | 1677 | 4.1 | 3089 | 5.5 |
| 75' | 1433 | 3.5 | 2853 | 4.3 |

The antioxidant of Example 1 may be made as follows:

26 grams of N,N' diphenyl-p-phenylene diamine, 27.2 grams of zinc chloride (anhydrous), and 20 grams of dry tertiary butyl alcohol are put in a sealed tube and heated in a bomb furnace for 16 hours at 150° C. Then the tube is opened, the zinc chloride extracted with caustic, and the product finally extracted with water. The product is dissolved in acetone and dried over calcium chloride. The acetone solution is filtered and then the acetone is removed by evaporation. 29 grams of a black viscous material remains and is used as such for rubber testing.

Other symmetrical diaryl arylene diamines that may be reacted with the aliphatic alcohols are di-tolyl p-phenylene diamine, phenyl tolyl p-phenylene diamine, di-p-methoxyphenyl p-phenylene diamine, di-xylyl p-phenylene diamine, di-alpha-naphthyl p-phenylene diamine, di-beta-naphthyl p-phenylene diamine, di-phenylol p-phenylene diamine, 1,4-di-anilido-naphthalene, p-di-phenyl toluylene diamine, diphenyl benzidine, dianilido anthracene.

Other aliphatic alcohols that may be reacted with diphenyl-p-phenylene diamine or any of the other diaryl arylene diamines are ethyl alcohol, n-propyl alcohol, iso-propyl alcohol, n-butyl alcohol, n-amyl alcohol, hexyl alcohol, heptyl alcohol, iso-butyl alcohol, tertiary butyl alcohol, iso-amyl alcohol, secondary amyl alcohol, tertiary amyl alcohol, ethylene glycol, allyl alcohol, dodecyl alcohol, etc.

It is understood that the invention may be applied to the preservation of natural rubber compositions as well as artificially prepared rubber compositions including reclaimed rubbers, and latices of such rubber compositions.

It is also to be understood that other desired filling and compounding ingredients may be incorporated along with the preservative, for example, in the case of rubber, there may be incorporated other accelerators, softeners, etc.

The antioxidant materials may be used in combination with other antioxidants such as ketoneamines, diaryl arylene diamines, mono- and dialkoxy diaryl amines, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling or mastication, and prepared for incorporation into dispersions or solutions either in powder, paste or solution form, or applied in such forms for incorporation by diffusion, to the surfaces of vulcanized or unvulcanized rubber goods.

Having thus described my invention, what I claim and desire to protect by Letters Patent is:

1. A process of controlling or retarding the oxidation of organic substances which tend to deteriorate by absorption of oxygen from the air which comprises incorporating therein a composite product of thermal reaction with elimination of water of an N,N' diaryl-arylene-diamine and an aliphatic alcohol of the formula $R(OH)_n$ where R is an aliphatic hydrocarbon group; O is oxygen; H is hydrogen; and $n$ is a whole number not greater than 2.

2. A process of controlling or retarding the oxidation of organic substances which tend to deteriorate by absorption of oxygen from the air which comprises incorporating therein a composite product of thermal reaction with elimination of water of N,N'-diphenyl-p-phenylene diamine and ethyl alcohol.

3. A process of controlling or retarding the oxidation of organic substances which tend to deteriorate by absorption of oxygen from the air which comprises incorporating therein a composite product of thermal reaction with elimination of water of N,N'-diphenyl-p-phenylene diamine and tertiary butyl alcohol.

LOUIS H. HOWLAND.